US008922345B2

(12) United States Patent
Kanda et al.

(10) Patent No.: US 8,922,345 B2
(45) Date of Patent: Dec. 30, 2014

(54) RFID TAG COMMUNICATION SYSTEM AND RFID TAG COMMUNICATION APPARATUS

(75) Inventors: Mitsuhiro Kanda, Nagoya (JP); Yuichiro Suzuki, Komaki (JP); Mai Fukutani, Anjo (JP); Minako Ishida, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 946 days.

(21) Appl. No.: 13/050,259

(22) Filed: Mar. 17, 2011

(65) Prior Publication Data

US 2011/0163852 A1 Jul. 7, 2011

Related U.S. Application Data

(63) Continuation-in-part of application No. PCT/JP2009/069087, filed on Nov. 10, 2009.

(30) Foreign Application Priority Data

Nov. 26, 2008 (JP) ................................. 2008-300443

(51) Int. Cl.
*G06K 7/01* (2006.01)
*G06K 7/10* (2006.01)

(52) U.S. Cl.
CPC ........ *G06K 7/10297* (2013.01); *G06K 7/10198* (2013.01)
USPC ..................................................... 340/10.1

(58) Field of Classification Search
CPC ............ G06K 7/0008; G06K 19/0723; G06K 19/07749; G06K 2017/0045
USPC .................. 340/10.1, 10.2, 10.3, 10.31, 10.4, 340/10.41, 10.42, 572.1
See application file for complete search history.

(56) References Cited

U.S. PATENT DOCUMENTS

| | | | |
|---|---|---|---|
| 6,899,270 B2 | 5/2005 | Obayashi et al. | |
| 2006/0006986 A1* | 1/2006 | Gravelle et al. | 340/10.3 |

FOREIGN PATENT DOCUMENTS

| | | |
|---|---|---|
| EP | 1 338 975 A1 | 8/2003 |
| EP | 1 667 336 A1 | 6/2006 |
| JP | 200562999 | 3/2005 |
| JP | 2006227695 | 8/2006 |
| WO | 2002041158 | 11/2001 |

OTHER PUBLICATIONS

The Extended European Search Report in EP 09828968.9 on May 25, 2012.
Chinese Office Action issued in Chinese Application No. 200980138806.4 on Apr. 1, 2013.
Notice of Reasons for Rejection; Japanese Application No. 2008-300443; dated: Jun. 11, 2012.

* cited by examiner

*Primary Examiner* — Jennifer Mehmood
*Assistant Examiner* — Yong Hang Jiang
(74) *Attorney, Agent, or Firm* — McCarter & English, LLP

(57) ABSTRACT

This disclosure discloses an RFID tag communication system comprising: a communication antenna that performs wireless communication using a plurality of communication formats with a plurality of types of RFID circuit elements, each of the RFID circuit elements having an IC circuit part configured to store information and a tag antenna configured to transmit and receive information, each type of the plurality of types of RFID circuit element having a different compatibility factor and lacking communication compatibility; a format switching portion that sequentially switches the plurality of communication formats in a switching order that corresponds to the frequency of use results of each of the plurality of communication formats used in the past; and an information acquisition portion that performs an acquisition process to acquire information by wireless communication from the RFID circuit elements using each of the communication formats that are sequentially switched by the format switching portion.

7 Claims, 12 Drawing Sheets

FIG. 6

TAG TYPE TABLE

| TAG TYPE | STANDARD | TRANSMITTED COMMANDS | COMMUNICATION PARAMETERS (COMMUNICATION SPEED, MODULATION FACTOR, ETC.) | ACTUAL NUMBER OF TIMES SCANNED | FREQUENCY CLASS |
|---|---|---|---|---|---|
| 1 | ISO15693 | ISO15693 COMMANDS | 26.48kbps, ASK 10%, ··· | 8 | B |
| 2 | ISO15693 | ISO15693 COMMANDS | 26.48kbps, ASK 100%, ··· | 17 | A |
| 3 | ISO15693 | EXCLUSIVE COMMANDS FOR PRODUCT P | 26.48kbps, ASK 100%, ··· | 0 | D |
| 4 | ISO14443A | ISO14443A COMMANDS | 106kbps, ASK 100%, ··· | 5 | C |

A=1 TIME
B=1 TIME
C=1 TIME
D=1 TIME

A=6 TIMES
B=3 TIMES
C=2 TIMES
D=1 TIME

WHEN A = 6 TIMES, B = 3 TIMES, C = 2 TIMES, D = 1 TIME

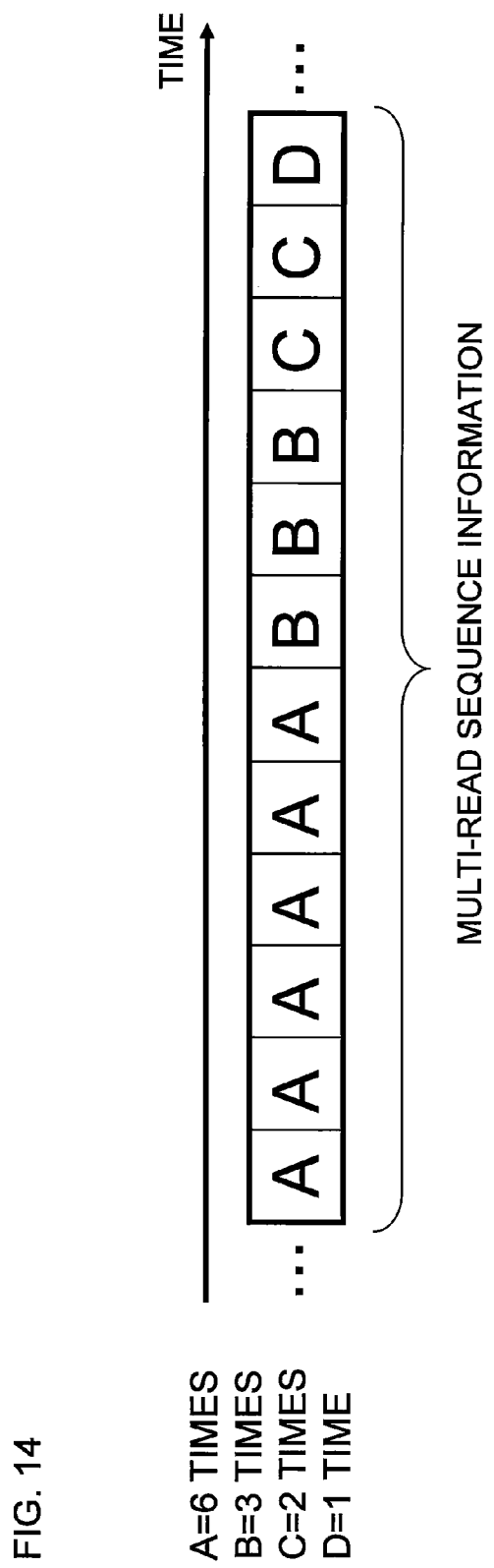

RFID TAG COMMUNICATION SYSTEM AND RFID TAG COMMUNICATION APPARATUS

CROSS-REFERENCE TO RELATED APPLICATION

This is a CIP application PCT/JP2009/069087, filed Nov. 10, 2009, which was not published under PCT article 21(2) in English.

BACKGROUND

1. Field

The present disclosure relates to an RFID tag communication system and RFID tag communication apparatus that are capable of communication by switching among a plurality of communication formats.

2. Description of the Related Art

There are known RFID (radio frequency identification) systems that perform contactless transmission and reception of information to and from RFID circuit elements that store information.

One such known RFID system is an information communication system capable of communicating with a plurality of different types of RFID tag by switching the communication format that corresponds to the respective RFID tag. This information communication system determines a priority ranking from the highest number of times each type was communicated with, and in response to an RFID tag of unknown type, it performs communication by sequentially switching among a plurality of communication formats in order from the type of highest priority ranking.

In the above-described prior art, a plurality of mutually different types of communication formats are sequentially switched by switching the communication protocol that corresponds to each communication format. However, this is no more than a scheme so that the order used when switching the communication format at equal intervals is the order of highest priority ranking, and looking within a certain fixed time period, the proportion of time occupied by each communication format is nearly equal. As a result, when the operator holds up the RFID tag and places the RFID circuit element within the communication range, for example, the probability that the communication formats will match and information scanning will be immediately completed is nearly equal for rarely-appearing communication formats that are infrequently used and for communication formats that are frequently used. Therefore, the expected value of the time until information scanning is complete after the operator holds up the RFID tag is low overall, due to a needlessly high number of communication opportunities being provided even for infrequently used communication formats, as described above. As a result, it cannot necessarily be said that wireless communication can be performed quickly and efficiently.

SUMMARY

It is therefore an object of the present disclosure to provide an RFID tag communication system and RFID tag communication apparatus capable of performing quick and efficient wireless communication with RFID circuit elements.

In order to achieve the above-described object, according to the first aspect of the present application, there is provided an RFID tag communication system comprising: a communication antenna that performs wireless communication using a plurality of communication formats with a plurality of types of RFID circuit elements, each of the RFID circuit elements having an IC circuit part configured to store information and a tag antenna configured to transmit and receive information, each type of the plurality of types of RFID circuit element having a different compatibility factor and lacking communication compatibility; a format switching portion that sequentially switches the plurality of communication formats in a switching order that corresponds to the frequency of use results of each of the plurality of communication formats used in the past; and an information acquisition portion that performs an acquisition process to acquire information by wireless communication from the RFID circuit elements using each of the communication formats that are sequentially switched by the format switching portion.

When communicating with an RFID circuit element, the information acquisition means performs information acquisition from the RFID circuit element by wireless communication using each communication format while the plurality of communication formats are sequentially switched by the format switching means. By sequentially switching the communication format in this way, wireless communication is accomplished and information can be read from the relevant RFID circuit element when the communication format matches the communication format of the RFID circuit element of the communication target. Thus, information can be reliably gathered by wireless communication regardless of the type of RFID circuit element.

In the first aspect, when the format switching means sequentially switches the plurality of communication formats, it switches them in a switching order that corresponds to the frequency of use results of each communication format used in the past up to the present. As a result, during this switching, switching is performed in a switching order that matches the actual current usage situation, such that communication formats used frequently in the past appear often, or communication formats used infrequently in the past seldom appear. As a result, the expected value of the time until information scanning is executed after the operator holds up the RFID tag and places the RFID circuit element within the communication range, for example, can be reduced compared to the case where the communication formats are simply switched in the same proportion without differentiation between those used frequently and those used infrequently, or the case where a plurality of communication formats are sequentially switched according to a predetermined priority ranking. As a result, wireless communication can be performed quickly and efficiently.

In order to achieve the above-described object, according to the second aspect of the present application, there is provided an RFID tag communication apparatus comprising: a communication antenna that performs wireless communication using a plurality of communication formats with a plurality of types of RFID circuit elements, each of the RFID circuit elements having an IC circuit part configured to store information and a tag antenna configured to transmit and receive information, each type of the plurality of types of RFID circuit element having a different compatibility factor and lacking communication compatibility; a format switching portion that sequentially switches the plurality of communication formats in a switching order that corresponds to the frequency of use results of each of the plurality of communication formats used in the past; and an information acquisition portion that performs an acquisition process to acquire information by wireless communication from the RFID circuit elements using each of the communication formats that are sequentially switched by the format switching portion.

When communicating with an RFID circuit element, the information acquisition means performs information acquisition from the RFID circuit element by wireless communication using each communication format while the plurality of communication formats are sequentially switched by the format switching means. By sequentially switching the communication format in this way, wireless communication is accomplished and information can be read from the relevant RFID circuit element when the communication format matches the communication format of the RFID circuit element of the communication target. Thus, information can be reliably gathered by wireless communication regardless of the type of RFID circuit element.

In this case, when the format switching means sequentially switches the plurality of communication formats, it switches them in a switching order which corresponds to the frequency of use results of each communication format used in the past up to the present. As a result, during this switching, switching can be performed in a switching order which matches the actual current usage situation. As a result, wireless communication with an RFID circuit element can be performed quickly and efficiently without needless switching time.

BRIEF DESCRIPTION OF THE DRAWINGS

FIG. 6 is a diagram schematically illustrating one example of a tag type table managed by the operation terminal.

FIG. 14 is a diagram illustrating a modification example of multiread sequence information.

DETAILED DESCRIPTION OF THE PREFERRED EMBODIMENTS

The following describes an embodiment of the present disclosure with reference to accompanying drawings.

Figure 1:
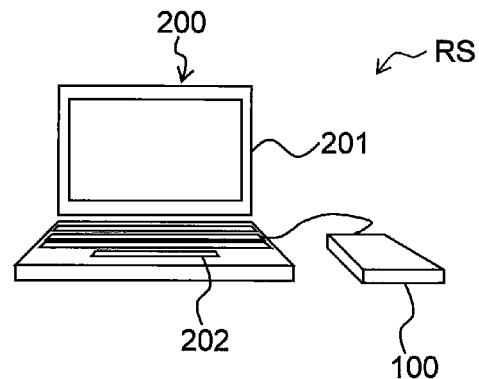
FIG. 1 is a system configuration diagram illustrating an RFID tag communication system comprising an RFID tag communication apparatus according to the first embodiment of the present disclosure.

An RFID tag communication system RS shown in FIG. 1 has an RFID tag communication apparatus 100, which is capable of communication by selectively switching among a plurality of mutually different communication formats (described in detail below), and an operation terminal 200, which is connected with the apparatus 100 via a USB cable, for example, and is capable of operating the apparatus 100. The operation terminal 200 is a commercially-sold general-purpose personal computer, which has a display part 201, such as a liquid crystal display, and an operation part 202, such as a keyboard or mouse. Note that, while the case illustrated here is one where the apparatus 100 and operation terminal 200 are connected by wire, they can also be wirelessly connected via wireless communication.

Figure 2:
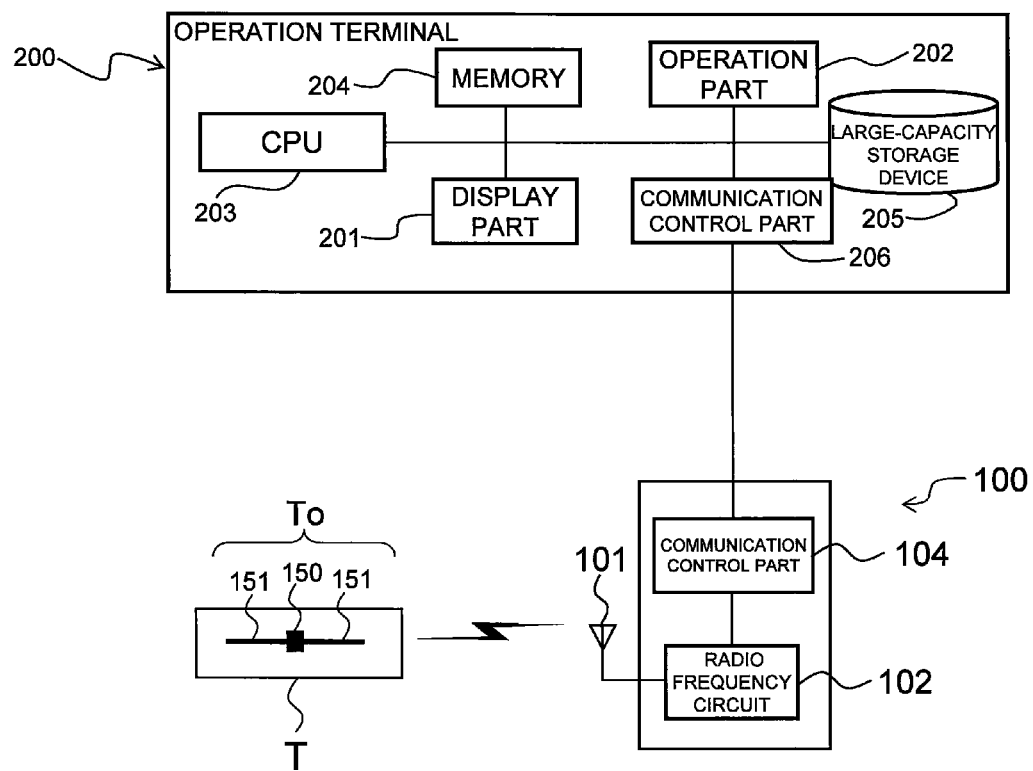
FIG. 2 is a functional block diagram illustrating the functional configuration of the overall RFID tag communication system.

As illustrated in FIG. 2, the operation terminal 200 comprises a CPU (central processing unit) 203; memory 204 such as RAM or ROM, for example; the above-described operation part 202 into which information or instructions from an operator are input; the above-described display part 201 that displays various information or messages; a large-capacity storage apparatus 205 that stores various information, comprising a hard disk apparatus; and a communication control unit 206 that controls transmission and reception of information signals to and from the apparatus 100 via an interface connection that conforms to a standard such as USB.

The CPU 203 processes signals in accordance with a program stored in advanced in ROM while utilizing the temporary storage function of RAM, thereby transmitting and receiving various instruction signals and information signals to and from the apparatus 100.

On the other hand, the apparatus 100 is a reader/writer capable of reading and writing information from and to a plurality of RFID circuit elements To, each of which comprises an IC circuit part 150 that stores information and a tag antenna 151 that transmits and receives information, by selectively switching a plurality of different communication formats as described above.

The apparatus 100 has a communication antenna 101 that forms a communication range (not shown) and performs wireless communication with RFID circuit elements To that are present within the communication range; a radio frequency circuit 102 that accesses the IC circuit part 150 of the above-described RFID circuit elements To by wireless communication via the communication antenna 101, and also processes signals read from those RFID circuit elements To; and a communication control part 104 that controls communication performed with the above-described operation terminal 200. The above-described radio frequency circuit 102 and the CPU 203 of the operation terminal 200 are capable of transmitting and receiving information via communication control parts 104 and 206.

Furthermore, as described in detail below, the RFID tag T that has the above-described RFID circuit element To has a communication format unique to that RFID circuit element To. That is, one RFID tag T is classified as one type based on the communication format that corresponds to its RFID circuit element To.

Figure 3:
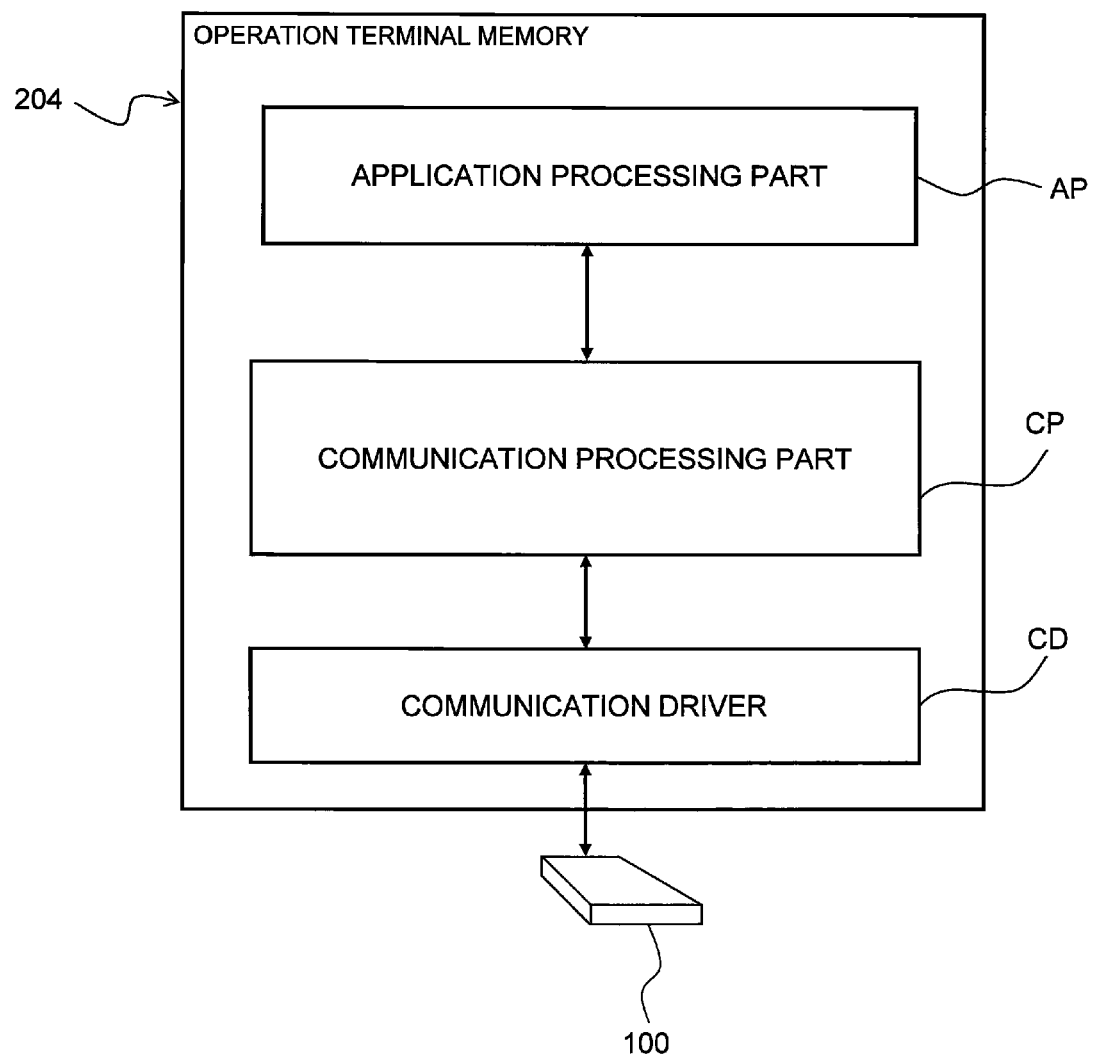
FIG. 3 is a block diagram illustrating one example of functional configuration of process control within an operation terminal.

As illustrated in FIG. 3, a plurality of application programs, communication processing programs and communication driver programs open and start up in the above-described memory (RAM) 204 of the operation terminal 200, and an application processing part AP, communication processing part CP and communication driver CD, which are functionally configured by the startup of these programs, become capable of transmitting and receiving instruction signals and information signals to and from each other. Also, the communication driver CD is configured so as to transmit and receive signals to and from the apparatus 100 via the interface connection between the above-described communication control parts 206 and 104.

The above-described application processing part AP performs processing in accordance with predetermined application programs in response to operations input by an operator by means of the above-described operation part 202, and generates corresponding processing instruction signals (read commands, write commands and the like), and outputs them to the communication processing part CP. The communication processing part CP generates corresponding control signals based on the processing instruction signals generated by the above-described application processing part AP, and controls the RFID communication 100 apparatus by transmitting them to the apparatus 100 via the communication driver CD.

Figure 4:
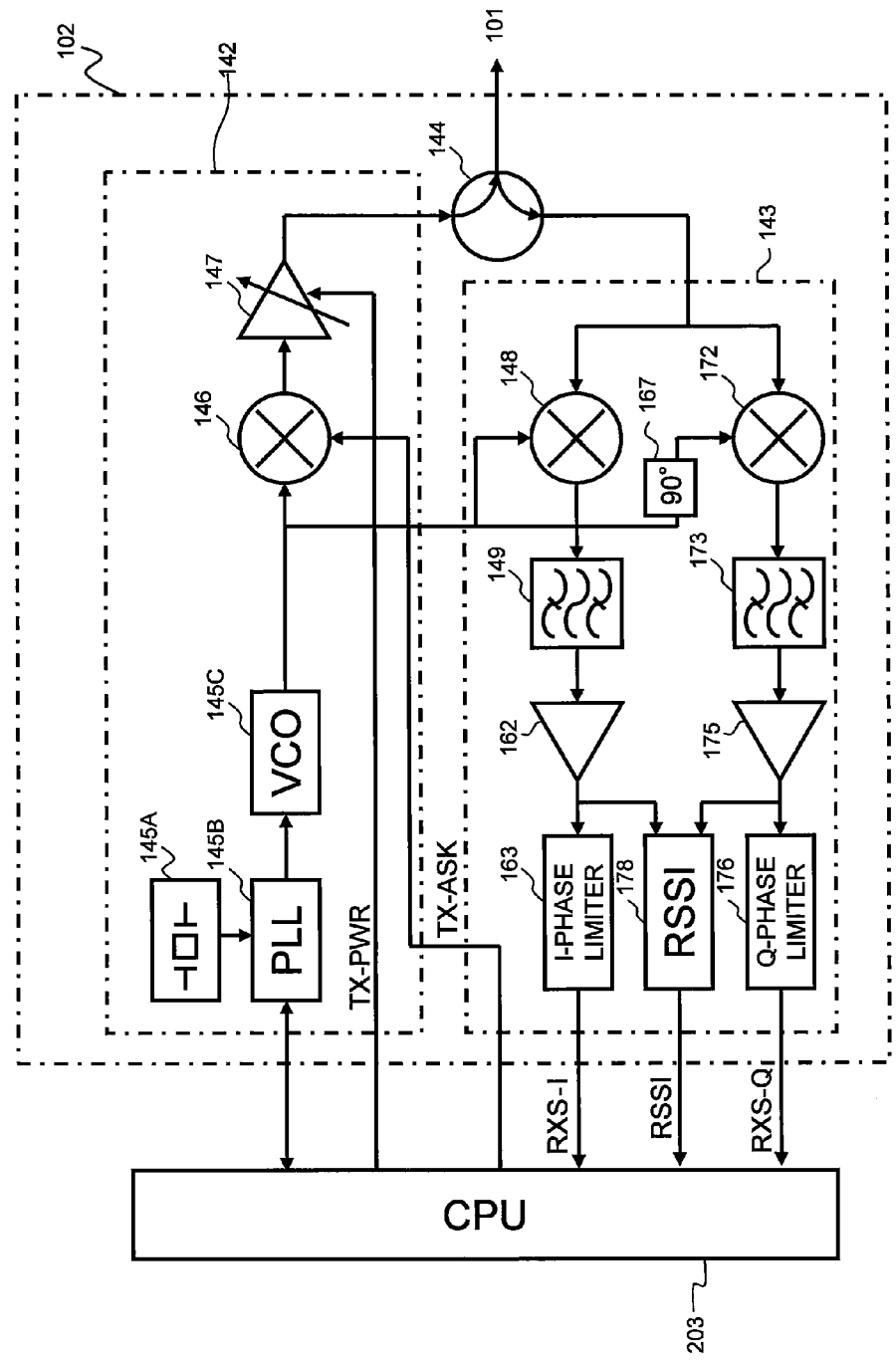
FIG. 4 is a functional block diagram illustrating the detailed configuration of the radio frequency circuit of an RFID tag communication system.

As illustrated in FIG. 4, the radio frequency circuit 102 accesses information of the IC circuit part 150 of the RFID circuit element To of the above-described RFID tag T via the above-described communication antenna 101. In the radio frequency circuit 102, signals read from the IC circuit part 150 of the RFID circuit element To of the RFID tag T, which are generated by the CPU 203 of the operation terminal 200, are processed so as to read the information, and also, various commands for accessing and writing the prescribed information to the IC circuit part 150 of the RFID circuit element To are input via the communication control units 206 and 104. Note that illustrations of the communication control parts 206 and 104 are omitted in FIG. 4 to avoid confusion.

The radio frequency circuit 102 comprises a transmitting portion 142 that transmits signals to the RFID circuit element To of the RFID tag T via the communication antenna 101, a receiving portion 143 that inputs a response wave from the RFID circuit element To received via the communication antenna 101, and a transmit-receive splitter 144.

The transmitting portion 142 is a block that generates an interrogation wave for accessing the RFID tag information of the IC circuit part 150 of the RFID circuit element To. That is, the transmitting portion 142 comprises a crystal oscillator 145A configured to output a frequency reference signal, a PLL (Phased Locked Loop) 145B and VCO (Voltage Controlled Oscillator) 145C configured to divide/multiply the frequency of the output of the crystal oscillator 145A so as to generate a carrier wave of a predetermined frequency based on control by the CPU 203, a transmission multiplying circuit 146 configured to modulate the above-described carrier wave generated based on the signal supplied from the above-described CPU 203 (in this example, perform amplitude modulation based on a "TX_ASK" signal from the CPU 203) (an amplifier with a variable amplification factor and the like may also be used in the case of amplitude modulation), and a gain control transmission amplifier 147 configured to amplify the modulated wave modulated by the transmission multiplying circuit 146 (in this example, perform amplification by an amplification factor determined by a "TX_PWR" signal from the CPU 203) so as to generate a desired interrogation wave. With such an arrangement, the carrier waves generated as described above employ a frequency in the UHF band (or microwave band, or short-wave band), and the output signal from the above-described gain control transmission amplifier 147 is transmitted to the communication antenna 101 via the transmit-receive splitter 144, whereby the output signal is supplied to the IC circuit part 150 of the RFID circuit element To. It should be noted that the interrogation wave is not limited to a signal modulated as described above (modulated wave), but may be transmitted simply by a carrier wave.

The receiving portion 143 comprises an I-phase receiving signal multiplying circuit 148 configured to multiply and demodulate the response wave from the RFID circuit element To received by the communication antenna 101 and the above-described carrier wave, an I-phase bandpass filter 149 for extracting only the signal of the required band from the output of the I-phase receiving signal multiplying circuit 148, an I-phase receiving signal amplifier 162 configured to amplify the output of the I-phase bandpass filter 149, an I-phase limiter 163 configured to further amplify the output of the I-phase receiving signal amplifier 162 and convert the amplified output to a digital signal, a Q-phase receiving signal multiplying circuit 172 configured to multiply the response wave from the RFID circuit element To received by the above-described communication antenna 101 and a signal wherein the phase of the above-described carrier wave was delayed 90° by a phase shifter 167, a Q-phase bandpass filter 173 for extracting only the signal of the required band from the output of the Q-phase receiving signal multiplying circuit 172, a Q-phase receiving signal amplifier 175 configured to amplify the output of the Q-phase bandpass filter 173, and a Q-phase limiter 176 configured to further amplify the output of the Q-phase receiving signal amplifier 175 and convert the amplified output to a digital signal. A signal "RXS-I," which is output from the above-described I-phase limiter 163, and a signal "RXS-Q," which is output from the Q-phase limiter 176, are input to the above-described CPU 203 for further processing.

Furthermore, the output signals of the I-phase receiving signal amplifier 162 and the Q-phase receiving signal amplifier 175 are also input to an RSSI (Received Signal Strength Indicator) circuit 178, which functions as a strength detecting means. The signal "RSSI" that indicates the strength of these signals is input to the CPU 203. As a result, the apparatus 100 is able to detect the received signal strength of the signal from the RFID circuit element To during communication with the relevant RFID circuit element To.

With such an arrangement, the above-described radio frequency circuit 102 can perform wireless communication corresponding to all communication formats by means of control by control signals from the CPU 203 based on processing by the above-described communication processing part CP.

Figure 5:
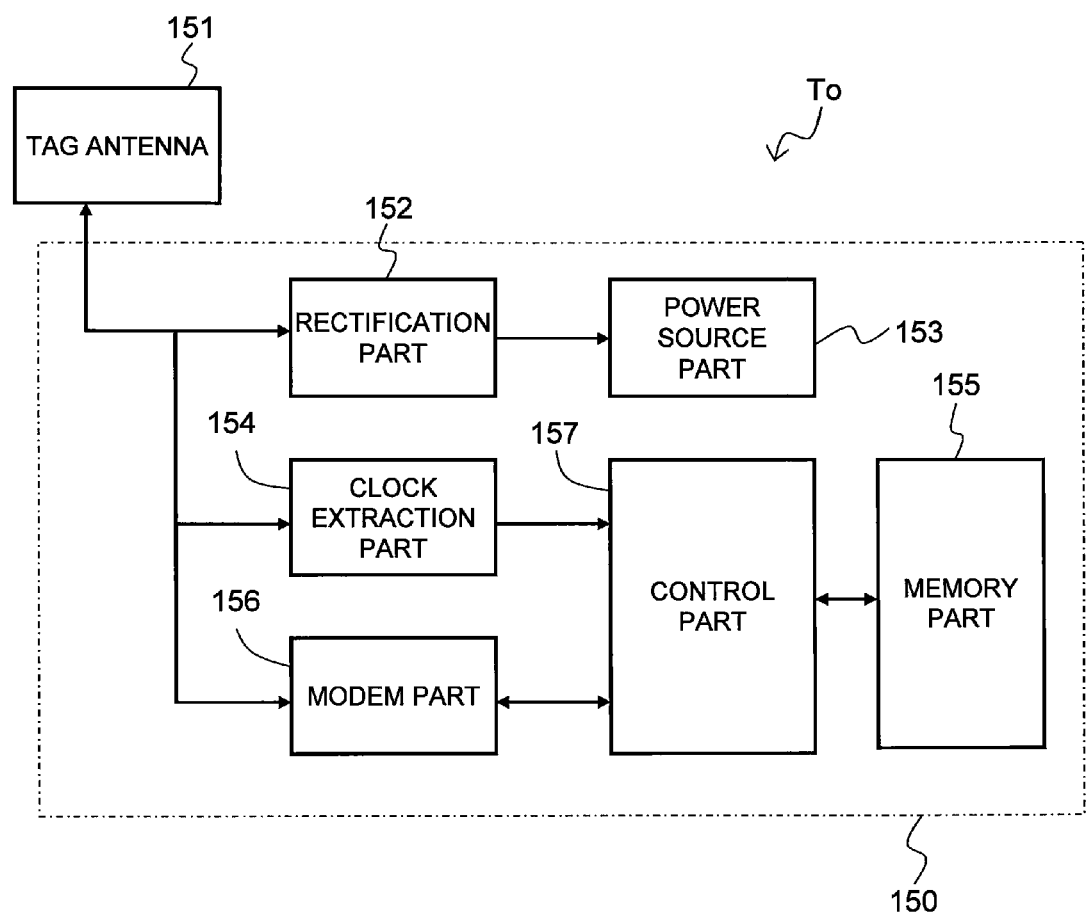
FIG. 5 is a functional block diagram illustrating an example of the functional configuration of an RFID circuit element provided in an RFID tag.

As illustrated in FIG. 5, the RFID circuit element To comprises the above-described tag antenna 151 configured to transmit and receive signals in a contactless manner with the communication antenna 101 of the apparatus 100 as described above, and the above-described IC circuit part 150 connected to this tag antenna 151. Note that the hardware configuration illustrated in the diagram is common, regardless of communication format or command type.

The IC circuit part 150 comprises a rectification part 152 configured to rectify the interrogation wave received via the tag antenna 151, a power source part 153 configured for use as a driving power source to store the energy of the interrogation wave rectified by the rectification part 152, a clock extraction part 154 configured to extract a clock signal from the interrogation wave received via the above-described tag antenna 151 and supply the clock signal thus extracted to a control part 157, a memory part 155 that is able to store predetermined information signals, a modem part 156 connected to the above-described tag antenna 151, and the above-described control part 157 for controlling the operation of the above-described RFID circuit element To via the above-described memory part 155, clock extraction part 154, modem part 156 and so forth.

The modem part 156 demodulates an interrogation wave from the communication antenna 101 of the above-described RFID tag communication apparatus 100 received via the tag antenna 151, and it modulates a reply signal from the above-described control part 157, and transmits it as a response wave (signal that includes a tag ID) from the tag antenna 151.

The clock extraction part 154 extracts the clock component from the received signal, and supplies the clock corresponding to the frequency of the relevant clock component thus extracted to the control part 157.

The control part 157 executes basic control, such as interpreting a received signal demodulated by the above-described modem part 156, generating a reply signal based on the information signal stored in the memory part 155, and returning the reply signal from the above-described tag antenna 151 via the above-described modem part 156.

As illustrated in FIG. 6, the tag type table managed by the operation terminal 200 is information managed only by the communication processing part CP, and is stored in the large-capacity storage apparatus 205 of the operation terminal 200.

As illustrated in FIG. 6, the tag type table shows the tag type numbers ("Tag Type" in the left-most column) set in order of registration for all tag types registered by the communication processing part CP. Then, it shows the communication compatibility factors of standard, transmitted commands and communication parameters corresponding to each tag type number (that is, corresponding to each tag type), as well as the recorded items of actual number of times scanned and frequency class. Among these items, "Standard," "Transmitted Commands" and "Communication Parameters" are fixed for the corresponding tag type (that is, they correspond to the communication format unique to each tag type as described above). "Actual Number of Times Scanned" and "Frequency Class" change over the course of numerous RFID tags T being scanned and accumulated.

In "Standard," the standard specified as the reference specification of the communication protocol of the RFID tag T is stored. In "Transmitted Commands," the command type based on the corresponding standard or an exclusive command type is stored. Here, as examples of communication protocols, ISO (International Organization for Standardization)/IEC 14443 Type A or Type B, ICO/IEC 15693, Felica (registered trademark) and so forth can be cited.

In "Communication Parameters," various settings required in wireless communication such as communication speed and modulation factor are stored, which can be varied within the range permitted by the corresponding standard. The communication format is determined by a combination of communication compatibility factors such as the standard, transmitted commands and communication parameters. Therefore, if any one of these settings of standard, transmitted commands or communication parameters differs, the communication formats are different, and wireless communication with an RFID tag of a certain type is normally not possible when using a communication format that is not unique to the relevant RFID tag. That is, normally, in order to perform wireless communication with a predetermined tag type registered in a tag type table, it is necessary to refer to the standard, transmitted commands and communication parameters that correspond to the relevant tag type, and to perform wireless communication in a communication format based on them.

In "Actual Number of Times Scanned," the number of times that it has been scanned (frequency of use results) via the communication antenna 101 up to that time is accumulated for each tag type and recorded. "Frequency Class" indicates the ranking of the actual number of times scanned. In this example, the letters "A," "B," "C," "D," . . . are assigned according to how high in the order the actual number of times scanned is. Furthermore, although not explained in particular detail, this frequency class is set in connection with the actual number of times scanned, and is assigned automatically by the communication processing part CP with the appropriate timing (for example, each time an RFID tag T is scanned). Note that in this example, frequency class is set uniquely for each tag type (that is, different frequency classes are set for all tag types). As a result, not only is it possible to individually specify each tag type using a tag type number, but it is also possible to individually specify each tag type using the frequency class, but there is not necessarily any such limitation.

Figure 7:
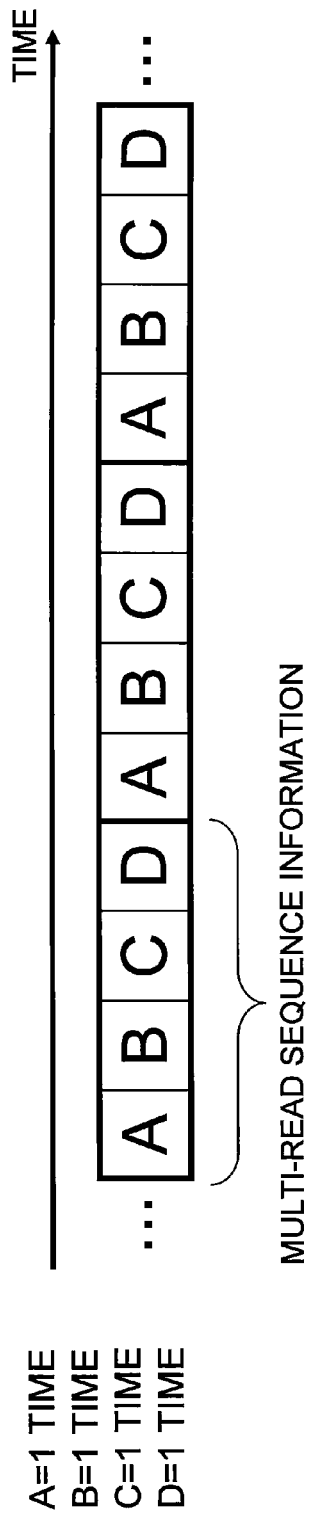
FIG. 7 is a diagram illustrating the most simple multiread sequence information.
Figure 8:
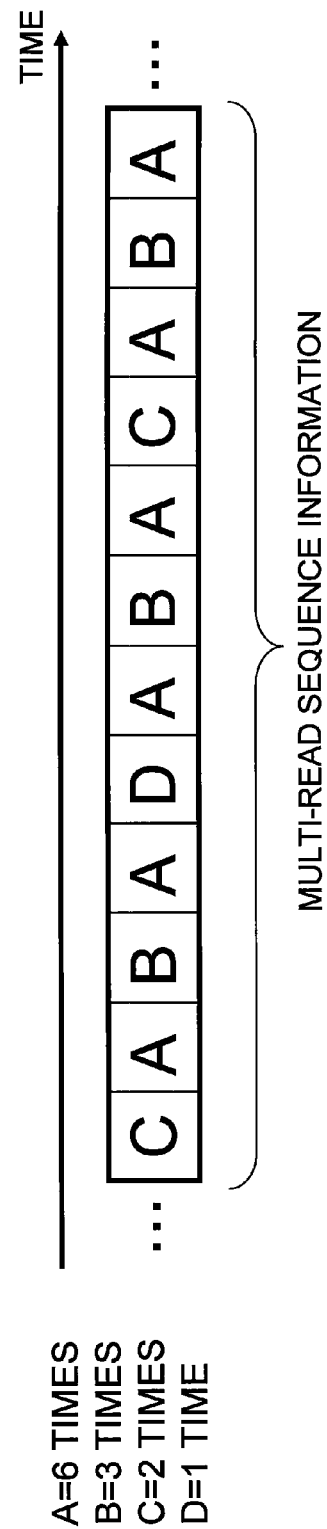
FIG. 8 is a diagram illustrating the multiread sequence information used in the embodiment.

Next, the method of switching the communication format (in other words, the tag type that is the object of communication) in the RFID tag communication system RS of this embodiment is explained using FIG. 7, FIG. 8 and FIG. 9.

First, in the RFID tag communication system RS of the present disclosure, the process of scanning RFID tags T is initiated by a predetermined operation, and after that, wireless communication by which one RFID tag T is scanned continues repeatedly. During this time, wireless communication is performed by constantly switching the tag type that is the object of communication and referencing the corresponding communication compatibility factors from the above-described tag type table each time it is switched. Thus, while wireless communication is being repeated in this way, scanning of an RFID tag T of unknown type is performed by the user positioning the RFID tag T within the communication range of the communication antenna 101. Because the RFID tag communication system RS constantly repeats wireless communication by switching the tag type, it performs appropriate scanning when it has performed wireless communication that corresponds to the tag type of an RFID tag T present within the communication range.

At this time, when wireless communication is repeated by switching the tag type, in this example, the tag type is not switched randomly, but is switched so as to repeat the same tag type switching order pattern with a fixed cycle. The order pattern for periodically switching the tag type in this way is called "multiread sequence information" below. The principle of the multiread sequence information method in this embodiment will be described with reference to FIG. 7 and FIG. 8.

FIG. 7 illustrates an example of the simplest multiread sequence pattern executed in an existing RFID tag communication system, which is a pattern that repeats all tag types once in order from the highest frequency class. In the example illustrated in the diagram, one piece of multiread sequence information is constructed of a total 4 wireless communications "ABCD."

However, in the multiread sequence information illustrated in FIG. 7, because switching is performed such that all tag types are assigned an equal number of times regardless of the scanning results of the past, it is expected that scanning efficiency will be markedly reduced in cases where there is a large bias by frequency class in the actual number of times scanned in the past.

That is, based on the actual number of times scanned, the tag type of frequency class "A" is expected to be scanned with the highest frequency in the future as well, but even if its frequency exceeds half of all tags scanned, for example, the opportunity to scan a tag type of frequency class "A" is only one in four, according to the multiread sequence information shown in FIG. 7. Therefore, it is expected that the probabilistic expected value that wireless communication will be performed immediately in accordance with the type of the RFID tag T whenever the user positions the relevant RFID tag T of unknown type within the communication range is fairly low.

On the other hand, for a tag type of frequency class "D," even in cases where the probability of being scanned in the future is extremely low (actual number of times scanned in the past is 0 or close to 0), the opportunity to scan it is also set to one in four in accordance with the multiread sequence information illustrated in FIG. 7, and therefore it is expected that needless wireless communication that results in no response will be excessively repeated.

Also, in the RFID tag communication system RS of this embodiment, scanning efficiency of an RFID tag T of unknown type is improved due to the fact that the tag type switching order is repeated according to the multiread sequence information illustrated in FIG. 8. As a characteristic of this multiread sequence information, a number of communications equal to 3 times the total number of tag types (maximum value of tag type number) is set as the standard length of the tag type switching cycle (that is, the full length of the multiread sequence information), and the number of communications of the respective corresponding frequency class within this cycle is set in accordance with the proportion of actual number of times scanned of each tag type. Furthermore, one opportunity to perform wireless communication is set in the multiread sequence information of this embodiment for all tag types, even for tag types that have not been scanned even once in the past (that is, a tag type for which the actual number of times scanned is 0). Also, this results in sequence information that is arranged such that tag types of frequency classes for which the number of communications has been set multiple times are distributed evenly across the entire multiread sequence information.

The example of the multiread sequence information illustrated in FIG. 8 was set up to correspond to the example of the tag type table contents illustrated in the above-described FIG. 6. The length of the switching cycle is set to three times the number of tag types of frequency classes "A" through "D," or 4×3=12 communications. Based on the fact that the actual number of times scanned for the frequency classes "A," "B," "C" and "D" are 17, 8, 5 and 0 times, respectively, the number of communications in the multiread sequence information are set to 6 times, 3 times, 2 times and 1 time (total of 12 times), respectively, which nearly correspond to the proportion of the number of times scanned for each frequency class with respect to the total number of times scanned (total of 30 times). That is, first, when the proportion of the actual number of times scanned is simply calculated, for class "A" it is (17/30)×12=6.8 (times), for class "B" it is (8/30)×12=3.2 (times), and for class "C" it is (5/30)×12=2.0 (times). On the other hand, because the actual number of times scanned for frequency class "D" is 0 times, the number of communications if set as is would be 0 (times). However, for the reasons described above, one communication is assured in the multiread sequence information, and as a result, in this example, by setting class "A" to 6 times, class "B" to 3 times and class "C" to 2 times, it is harmonized to a total of 12 times including 1 time for class "D" (=harmonic correction; refer to FIG. 12 described below). Also, for frequency classes "A," "B" and C" for which the number of communications has been set multiple times, the opportunities for performing wireless communication for the respective classes are distributed evenly across the entire multiread sequence information.

In this situation, the tag type of frequency class "A," which was actually scanned the highest number of times in the past, has a high probability of being scanned in the future as well, and it is expected that the probabilistic expected value that wireless communication will be performed immediately according to the type of the RFID tag T when the user positions the relevant RFID tag T of a tag type of frequency class "A" within the communication range is fairly high. Also, for RFID tags T of tag types of frequency classes "B" and "C," which also have a high probability of being scanned in the future, it is expected that wireless communication according to the relevant tag type will be performed quickly with the sequential suitable probabilistic expected values. As described above, wireless communication can be performed quickly and efficiently for an RFID tag T of unknown type, by setting 6 (times), 3 (times), 2 (times) and 1 (time) for frequency classes "A," "B," "C" and "D," respectively, in accordance with the actual number of times scanned in the past.

Next is described the method by which the communication opportunities are made even across all of the multiread sequence information, for all frequency classes for which the number of times it is set in one piece of multiread sequence information has been determined as described above.

The right side of the diagram in the FIG. 9 illustrates the process that deals out the number of communications for each frequency class based on the example of tag type table contents of FIG. 6, and the left side of the diagram illustrates the process that generates the multiread sequence information that is the object of generation. That is, the diagram illustrates the process that generates multiread sequence information, wherein, in the state where the number of communications for each frequency class has been set in advance in the multiread sequence information in the right half of the diagram, a communication opportunity is dealt out one at a time to the left half of the diagram based on predetermined rules, and arranged left-justified in the diagram.

Here, the rule for dealing out the above-described communication opportunities is, if the remaining number of communications of a predetermined frequency class is judged to be greater than the total remaining number of communications of all lower-ranked frequency classes including the relevant "predetermined frequency class," then one communication opportunity is dealt out from the remaining number of communications of the relevant "predetermined frequency class" to the multiread sequence information, and this dealing out of communication opportunities is repeated in order moving downward from the frequency class of highest rank (that is, "A"). In this example, the judgment criterion of the above-described "greater than" is whether or not it is larger than one-half the total.

Figure 9A:
FIG. 9 is a diagram explaining the procedure that generates the multiread sequence information illustrated in FIG. 8 corresponding to the example of tag type table contents illustrated in FIG. 6.

First, in FIG. 9A, the number of communications of each frequency class, which were preset for one piece of multiread sequence information as described above based on the example of the tag type table contents of the above-described FIG. 6, are held in the right half of the diagram. That is, this state is the initial state in which the number of remaining communications of frequency classes "A," "B," "C" and "D" have been set to 6 times, 3 times, 2 times and 1 time, respectively.

Here, when the rule pertaining to dealing out communication opportunities is applied, first, it is judged whether or not the remaining number of communications of the highest class "A" (=6) is greater than (more than one-half of) the total remaining number of communications of all lower-ranked frequency classes including the relevant class (that is, all classes "A" through "D") (=12). In this case, because 6=12/2, the judgment of "greater than" is not satisfied, and a communication opportunity is not dealt out from the remaining number of communications of frequency class "A." Then, the flow proceeds to judgment regarding the next lower-ranked frequency class "B."

For frequency class "B," similar to above, the judgment is not satisfied because the corresponding remaining number of communications (=3) is one-half the total remaining number of communications of all lower-ranked classes including the relevant class (that is, classes "B" through "D"). For this reason, a communication opportunity is not dealt out from the corresponding remaining number of communications, similar to frequency class "A," and the flow proceeds to judgment regarding the next lower-ranked frequency class "C."

For the next frequency class "C," because the corresponding remaining number of communications (=2) is greater than one-half (=1.5) the total (=3) remaining number of communications of all lower-ranked classes including the relevant class (that is, classes "C" and "D"), the judgment is satisfied. As a result, as shown in FIG. 9B, one communication opportunity "C" is dealt out from the remaining number of communications corresponding to frequency class "C" (1 is subtracted from the remaining number of communications), and it is arranged left justified (that is, in tag type switching order) in the multiread sequence information on the left side of the diagram.

Figure 9B:
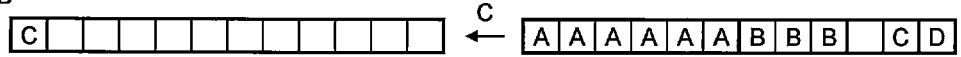
Figure 9C:
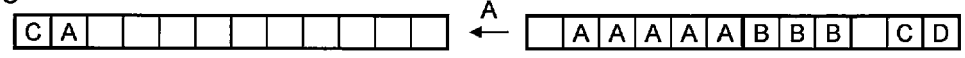
Figure 9D:
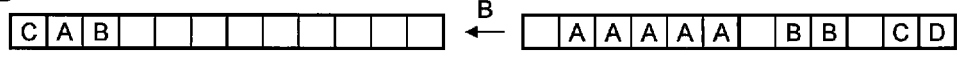
Figure 9E:
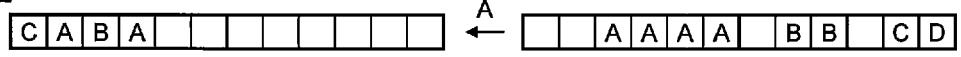
Figure 9F:
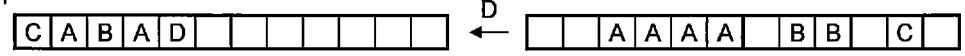
Figure 9G:
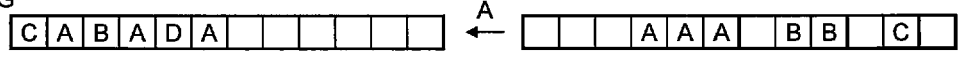
Figure 9H:
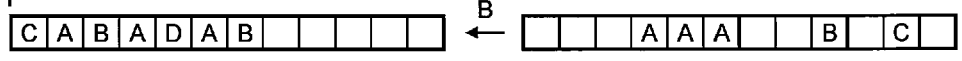
Figure 9I:
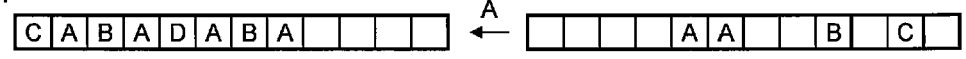
Figure 9J:
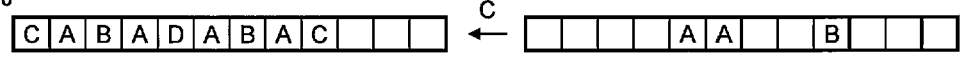
Figure 9K:
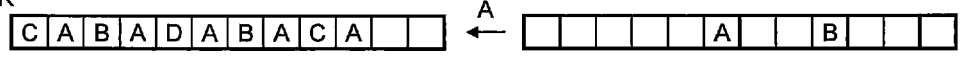
Figure 9L:
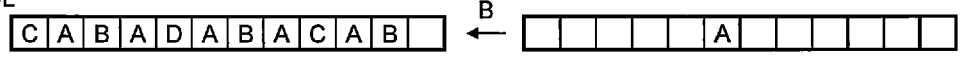

Each time a communication opportunity is dealt out in this way, the judgment returns to the highest-ranked frequency class "A." That is, next, in the state illustrated in FIG. 9B, it is judged whether or not the remaining number of communications of the highest-ranked class "A" (=6) is greater than (more than one-half of) the total remaining number of communications of all lower-ranked frequency classes including the relevant class (that is, all classes "A" through "D") (=11). In this case, the judgment is satisfied, because 6>11/2 (=5.5). As a result, as shown in FIG. 9C, one communication opportunity "A" is dealt out from the remaining number of communications corresponding to frequency class "A," and it is arranged left-justified (to the right of "C" that was previously dealt out) in the multiread sequence information. Then, the judgment returns to the highest-ranked frequency class "A."

Figure 9M:
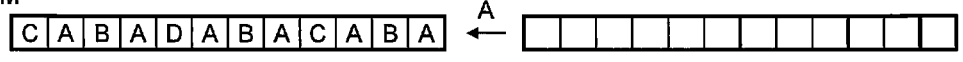

Thereafter, by repeating the same judgment and dealing out of the remaining number of communications, when all communication opportunities have been dealt out as shown in FIG. 9M, multiread sequence information arranged such that the communication opportunities of all frequency classes are evenly distributed across its entirety (refer to FIG. 8) is generated. Note that the method of even distribution illustrated in FIG. 9 (prevention of biased distribution of communication opportunities) is one example, but other methods can be used.

Figure 10:
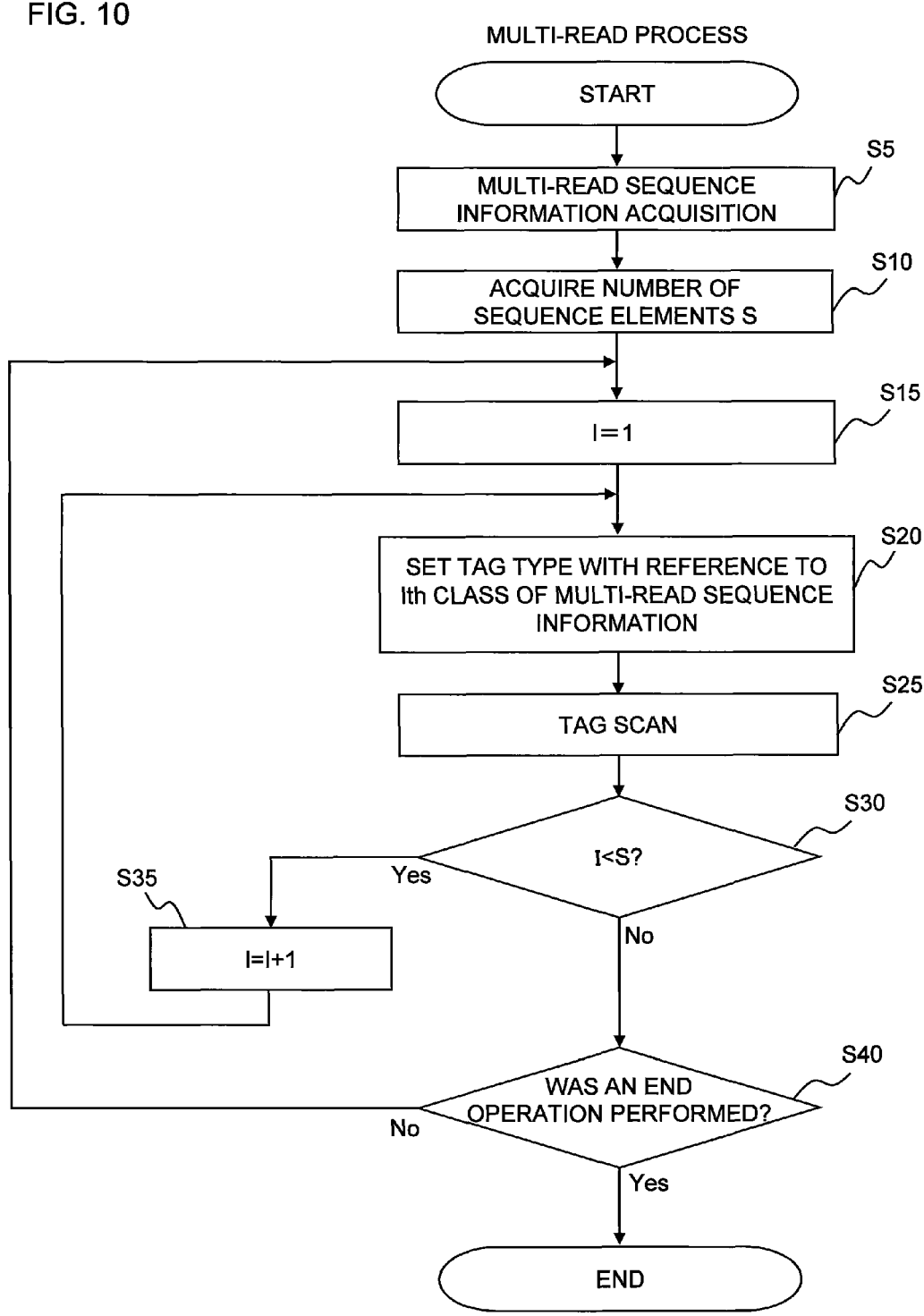
FIG. 10 is a flowchart illustrating a control procedure of the multiread process executed by the CPU of the operation terminal.

The control procedure of the multiread process is described by FIG. 10. This multiread process is one of the processes executed in the above-described communication processing part CP. This flow begins when an execution start instruction is received via operation of the operation part 202. Also, at the time when the flow begins, the frequency classes of the tag type table have already been set according to the actual number of times scanned.

In FIG. 10, first, in step S5, the latest multiread sequence information is acquired. The multiread sequence information updated to the latest contents corresponding to changes over time in the actual number of times scanned and frequency class of each tag type can be acquired by periodically executing the multiread sequence information update process described below at predetermined time intervals.

Then, the flow proceeds to step S10, where the number of sequence elements S (in the above-described example, S=12 from the number of tag types×3) of the multiread sequence information acquired in the above-described step S5 is acquired. This can be acquired by counting the total number of communications set in the acquired multiread sequence information.

Then, the flow proceeds to step S15, where the counter variable I is initialized to 1.

Then, the flow proceeds to step S20, where the corresponding tag type (in other words, the communication format) is set as the tag type (communication format) of the object of communication.

Then, the flow proceeds to step S25, where the communication compatibility factors (in this example, standard, transmitted commands and communication parameters) corresponding to the communication format set in the above-described step S20 are acquired from the tag type table, and wireless communication is performed based on them, and the RFID tag T is scanned.

Then, the flow proceeds to step S30, where it is judged whether or not the value of the counter variable I is smaller than the value of the number of sequence elements S acquired in the above-described step S10, that is, whether or not all of the sequence elements in the multiread sequence information have been around once and wireless communication of the corresponding tag types has ended. If the value of the counter variable I is smaller than the value of the number of sequence elements S, the judgment is satisfied, that is, it is seen to be in the midst of a switching cycle of one piece of multiread sequence information. Then, in the next step S35, the value of the counter variable I is incremented by 1, and the flow returns to step S20, where the same procedure is repeated. On the other hand, if the value of the counter variable I is the same as the value of the number of sequence elements S, the judgment is not satisfied, that is, it is seen that the switching cycle of one piece of multiread sequence information has ended, and the flow then proceeds to the next step S40.

In step S40, it is judged whether or not a predetermined end operation was input via the operation part 202. If an end operation was input, the judgment is satisfied and the flow ends. If an end operation was not input, the judgment is not satisfied and the flow returns to step S15, where the same procedure is repeated.

By performing a control procedure by the above-described flow, scanning communication of RFID tag T is performed by switching the tag type in a pattern order according to multiread sequence information, and this switching cycle can be continuously repeated until a predetermined end operation is input.

Figure 11:
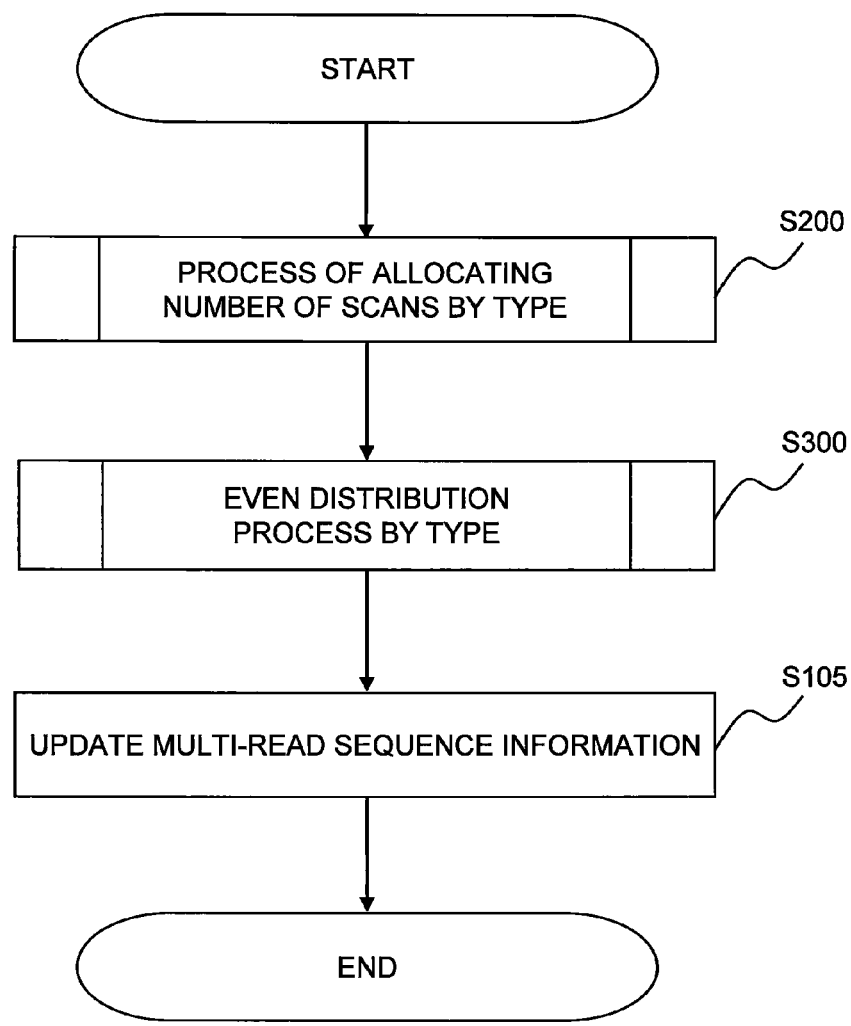
FIG. 11 is a flowchart illustrating a control procedure of the multiread sequence information update process executed by the CPU of the operation terminal.

The control procedure of the multiread sequence information update process is described by FIG. 11. This multiread sequence information update process is one of the processes executed in the above-described communication processing part CP. This flow is started automatically at predetermined time intervals. Also, at the time when the flow begins, the frequency classes of the tag type table have already been set according to the actual number of times scanned.

In FIG. 11, first, in step S200, the number of scans allocated to each tag type corresponding to each frequency class among the number of sequence elements of the multiread sequence information are calculated, and the process of allocating the number of scans of each type is executed.

Then, the flow proceeds to step S300, where the even distribution process by type is executed (refer to FIG. 13 described below), wherein the communication opportunities for each frequency class are evenly distributed across the entire multiread sequence information by the method illustrated in the above-described FIG. 9.

Then, the flow proceeds to step S105, where the multiread sequence information is updated using multiread sequence information newly generated in the above-described step S200 and step 300. It can be updated by overwriting old multiread sequence information, for example, or by storing the updated multiread sequence information such that it can be clearly distinguished from the old.

Figure 12:
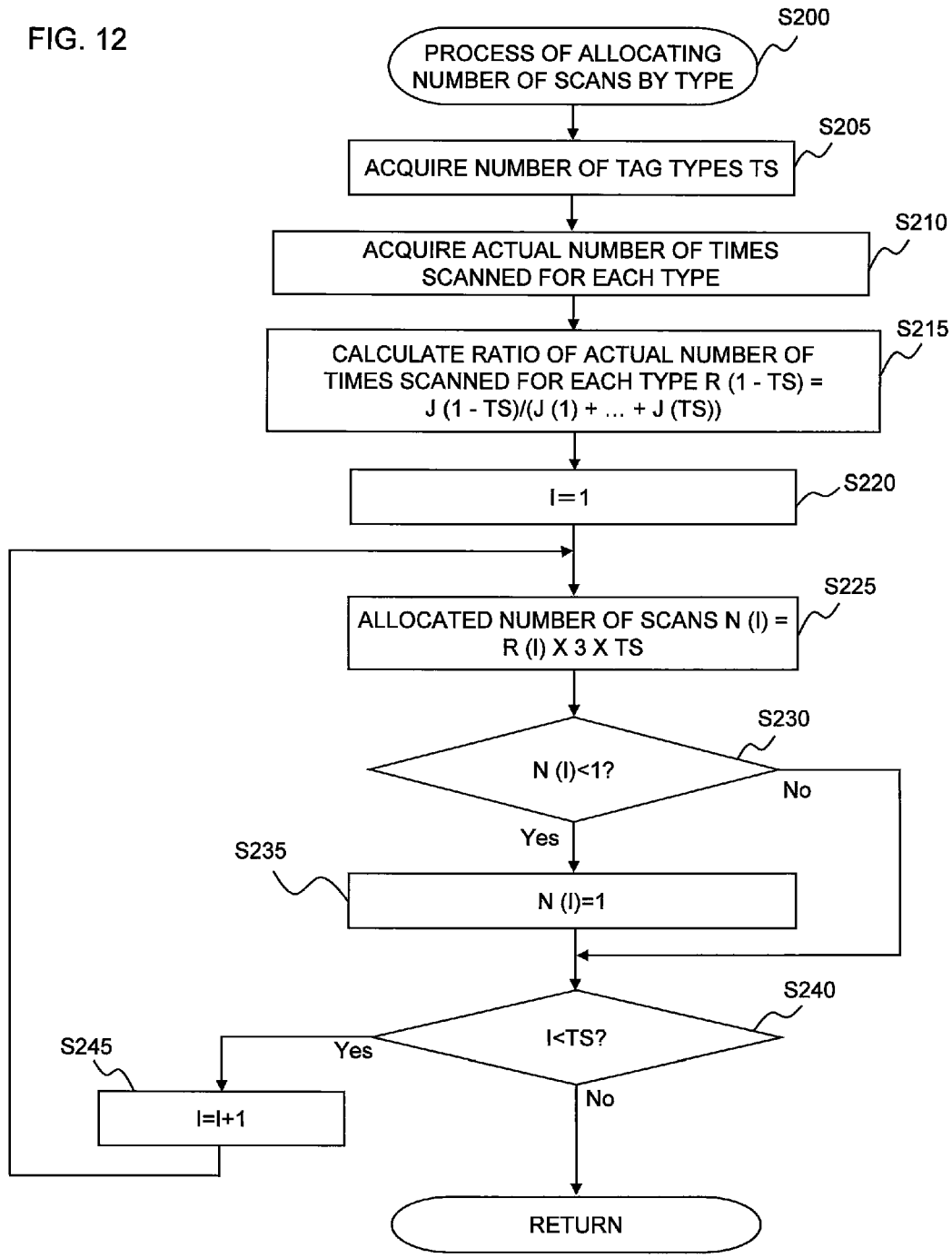
FIG. 12 is a flowchart illustrating the detailed procedure of the process of allocating the number of scans by type executed in step S200 in FIG. 11.

The detailed procedure of the process of allocating the number of scans of each type is described by FIG. 12.

In FIG. 12, first, in step S205, the number of tag types TS is acquired. This number of tag types TS is the total number of tag types registered in the tag type table illustrated in the above-described FIG. 6, that is, it has the same value as the maximum value of the tag type number. Note that in this flow, the tag type is specified by the tag type number.

Then, the flow proceeds to step S210, where the actual number of times scanned corresponding to each tag type is acquired as sequence information J (1-TS) by referencing the same tag type table. Here, sequence information J (X) means the actual number of times scanned corresponding to the tag type having tag type number X. Also, the actual number of times scanned J (1-TS) is the set of TS pieces of information, from actual number of times scanned J (1) through actual number of times scanned J (TS) (similarly below).

Then, the flow proceeds to step S215, where the ratio of actual number of times scanned for each tag type R (1-TS) is calculated. This ratio of actual number of times scanned R (X) can be determined by (J (X)/(J (1)+ . . . +J (TS)), that is, it is a value that indicates the proportion of tag type X among all RFID tags scanned in the past.

Then, the flow proceeds to step S220, where the counter variable I corresponding to the tag type number is initialized to 1.

Then, the flow proceeds to step S225, where the allocated number of scans N (I) is calculated from R (I)×3×TS. That is, in this example, a value equal to 3 times the total number of tags TS (3×TS) is used as the standard length of multiread sequence information (but it is not limited thereto, and other values may be used). Then, in step S225, by multiplying the ratio of actual number of times scanned R (I) by 3TS, the allocated number of communication opportunities of tag type I in one piece of multiread sequence information is calculated in accordance with the scan proportion of the past of the tag type having tag type number I (expressed as tag type I below). Furthermore, this allocated number of scans N (I) can be made into an integer by processing the fractional portion after the decimal point by a suitable method such as rounding, truncation and so forth. Below, the integer value of this allocated number of scans N (I) is simply expressed as N (I).

Next, the flow proceeds to step S230, where it is judged whether or not the allocated number of scans N calculated in the above-described step S225 is less than 1. If the allocated number of scans N (I) is less than 1, the judgment is satisfied, and since it is required that at least one communication opportunity of tag type I is assured in the multiread sequence information, N (I) is set to 1 in the next step S235, and then the flow proceeds to the following step S240. On the other hand, if the allocated number of scans N (I) is 1 or more, the judgment is not satisfied, that is, it is seen that at least one communication opportunity of tag type I in the multiread sequence information is assured, and the flow proceeds to the following step S240 as is.

In step S240, it is judged whether or not the value of the counter variable I is smaller than the value of the number of tag types TS, that is, whether or not the allocated number of scans N (I) was calculated for all tag types. If the value of the counter variable I is smaller than the value of the number of tag types TS, the judgment is satisfied, and in the next step S245, the value of the counter variable I is incremented by 1, after which the flow returns to step S225, where the same procedure is repeated. On the other hand, if the value of the counter variable I is the same as the value of the number of tag types TS, the judgment is not satisfied, and the flow ends.

By performing the control procedure by the above-described flow, the allocated number of scans N (1-TS) are set, which are the remaining number of communications of each tag type 1 through TS for generating multiread sequence information.

Figure 13:
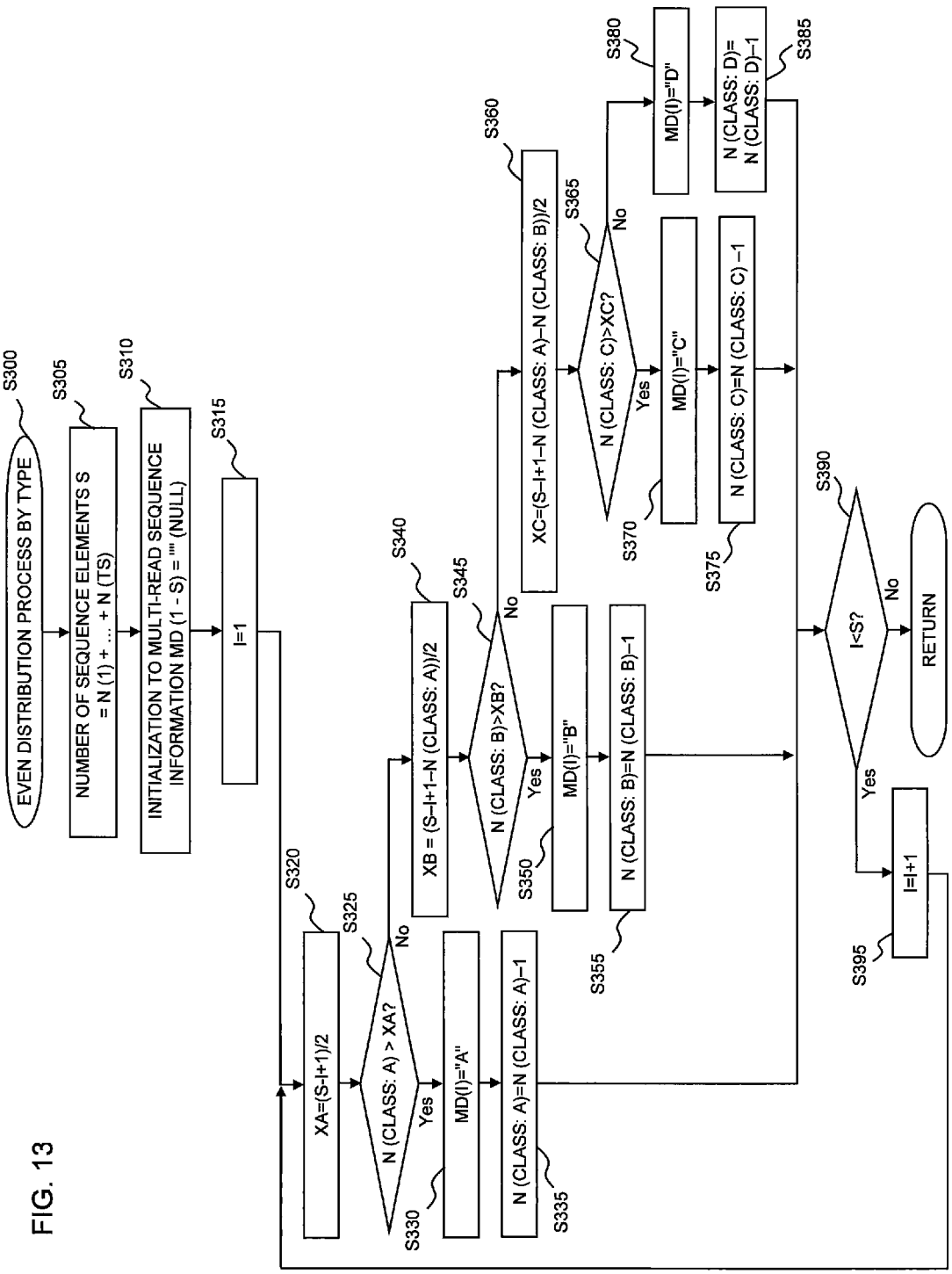
FIG. 13 is a flowchart illustrating the detailed procedure of the even distribution process by type executed in step S300 in FIG. 11.

The detailed procedure of the even distribution process in order to execute the multiread sequence information generation method illustrated previously in FIG. 9 is described by FIG. 13. Unless otherwise noted, the tag type is specified by the tag type number; when expressed as "N (class: A)", the tag type is specified by the frequency class. Also, to avoid confusion, FIG. 13 illustrates an example of the flow for the case where the number of tag types TS is 4 (4 types of frequency class "A" through "D"), which corresponds to the tag type table example of the above-described FIG. 6 and the example explained in FIG. 9.

In FIG. 13, first, in step S305, the number of sequence elements S of the multiread sequence information to be generated is calculated. This number of sequence elements S can be determined by the sum of the allocated number of scans N (1-TS) (N (1)+ . . . +(N) (TS)) calculated in the process of allocating the number of scans of each type of the above-described FIG. 12, that is, it is the total number of communications in one piece of multiread sequence information, or in order words, the number of times the tag type is switched in one switching cycle. Furthermore, this number of sequence elements S may differ from the standard length 3×TS described above, due to processing of the fractional portion after the decimal point of the allocated number of scans N (1-TS) in step S225, step S230, step S235 and so forth.

Then, the flow proceeds to step S310, where the contents of the multiread sequence information MD (1-S) are initialized. Specifically, initialization is defined as generation of the multiread sequence information MD with a length equal to the number of sequence elements S calculated in the above-described step S305, where a letter that represents the frequency class is substituted into each element in the multiread sequence information MD (1-S), and initialization is performed by substituting a null character " " into each element.

Then, the flow proceeds to step S315, where the counter variable I is initialized to 1.

Then, the flow proceeds to step S320, where judgment comparison value XA=(S−I+1) is calculated. This judgment comparison value XA is the value that is compared with N (class: A), which is the remaining number of communications of the tag type that corresponds to frequency class "A."

Then, the flow proceeds to step S325, where it is judged whether or not N (class: A)>XA, that is, whether the remaining number of communications of frequency class "A" (=N (class: A)) is greater than (more than one-half of) the total remaining number of communications of all lower-ranked frequency classes including the relevant class (that is, all classes "A" through "D") (=S−I+1). If the allocated number of scans N (class: A) is greater than the judgment comparison value XA, the judgment is satisfied, that is, the flow proceeds to the next step S330, where one communication opportunity "A" is dealt out to the multiread sequence information MD (I) from the remaining number of communications corresponding to frequency class "A."

In step S330, the letter "A" is substituted into the contents of the multiread sequence information MD (I). That is, the $I^{th}$ wireless communication in the multiread sequence information MD is set so as to be performed for the tag type corresponding to frequency class "A".

Then, the flow proceeds to step S335, where the allocated number of scans N (class: A) is decremented by 1. That is, the allocated number of scans of frequency class "A" (=N (class: A)) is decremented by 1, and in the above-described step S330 and step S335, one communication opportunity "A" is dealt out to the multiread sequence information MD from the remaining number of communications corresponding to frequency class "A." Then, the flow proceeds to the next step S390.

On the other hand, if the allocated number of scans N (class: A) is less than or equal to the judgment comparison value XA in the judgment of the above-described step S325, the judgment is not satisfied, that is, a communication opportunity "A" cannot be dealt out to the multiread sequence information MD (I) from the remaining number of communications corresponding to frequency class "A," and the flow proceeds to step S340 so as to proceed to the judgment regarding frequency class "B," which is the next lower-ranked class.

In step S340, the judgment comparison value XB=(S−I+1−N (class: A))/2 is calculated. This judgment comparison value XB is the value that is compared with N (class: B), which is the remaining number of communications of the tag type that corresponds to frequency class "B."

Then, the flow proceeds to step S345, where it is judged whether or not N (class: B)>XB—that is, whether the remaining number of communications of frequency class "B" (=N (class: B)) is greater than (more than one-half of) the total remaining number of communications of all lower-ranked frequency classes including the relevant class (that is, all classes "B" through "D") (=S−I+1−N (class: A)). If the allocated number of scans N (class: B) is greater than the judgment comparison value XB, the judgment is satisfied, that is, the flow proceeds to the next step S350, where one communication opportunity "B" is dealt out to the multiread sequence information MD (I) from the remaining number of communications corresponding to frequency class "B."

In step S350, the letter "B" is substituted into the contents of the multiread sequence information MD (I), and in the next step S355, the value of the allocated number of scans N (class: B) is decremented by 1. By step S350 and step S335, one communication opportunity "B" is dealt out to the multiread sequence information MD from the remaining number of communications of frequency class "B." Then, the flow proceeds to the next step S390.

On the other hand, if the allocated number of scans N (class: B) is less than or equal to the judgment comparison value XB in the judgment of the above-described step S345, the judgment is not satisfied, that is, a communication opportunity "B" cannot be dealt out to the multiread sequence information MD (I) from the remaining number of communications corresponding to frequency class "B," and the flow proceeds to step S360 so as to proceed to the judgment regarding frequency class "C," which is the next lower-ranked class.

In step S360, the judgment comparison value XC=(S−I+1−N (class: A)−N (class: B))/2 is calculated. This judgment comparison value XC is the value that is compared with N (class: C), which is the remaining number of communications of the tag type that corresponds to frequency class "C."

Then, the flow proceeds to step S365, where it is judged whether or not N (class: C)>XC—that is, whether the remaining number of communications of frequency class "C" (=N (class: C)) is greater than (more than one-half of) the total remaining number of communications of all lower-ranked frequency classes including the relevant class (that is, classes "C" and "D") (=S−I+1−N (class: A)−N (class: B)). If the allocated number of scans N (class: C) is greater than the judgment comparison value XC, the judgment is satisfied, that is, the flow proceeds to the next step S370, where one communication opportunity "C" is dealt out to the multiread sequence information MD (I) from the remaining number of communications corresponding to frequency class "C."

In step S370, the letter "C" is substituted into the contents of the multiread sequence information MD (I), and in the next step S375, the value of the allocated number of scans N (class: C) is decremented by 1. By step S370 and step S375, one communication opportunity "C" is dealt out to the multiread sequence information MD from the remaining number of communications of frequency class "C." Then, the flow proceeds to the next step S390.

On the other hand, if the allocated number of scans N (class: C) is less than or equal to the judgment comparison value XC in the judgment of the above-described step S365, the judgment is not satisfied, that is, a communication opportunity "C" cannot be dealt out to the multiread sequence information MD (I) from the remaining number of communications corresponding to frequency class "C," and the flow proceeds to step S380, where one communication opportunity "D" is dealt out to the multiread sequence information MD (I) from the remaining number of communications corresponding to frequency class "D," which is the lowest-ranked class.

In step S380, the letter "D" is substituted into the contents of the multiread sequence information MD (I), and in the next step S385, the value of the allocated number of scans N (class: D) is decremented by 1. By step S380 and step S385, one communication opportunity "D" is dealt out to the multiread sequence information MD from the remaining number of communications of frequency class "D." Then, the flow proceeds to the next step S390.

In step S390, it is judged whether or not the value of the counter variable I is smaller than the value of the number of sequence elements S acquired in the above-described step S305, that is, whether or not frequency classes have been set in all of the sequence elements MD (1-S) in the multiread sequence information MD, and generation of multiread sequence information MD has ended. If the value of the counter variable I is smaller than the value of the number of sequence elements S, the judgment is satisfied, that is, it is seen to be in the midst of generating multiread sequence information MD. Then, in the next step S395, the value of the counter variable I is incremented by 1, and the flow returns to step S320, where the same procedure is repeated. On the other hand, if the value of the counter variable I is the same as the value of the number of sequence elements S, the judgment is not satisfied, that is, it is seen that generation of multiread sequence information MD has ended, and the flow ends.

By performing the control procedure by the above-described flow, the communication opportunities for each frequency class can be arranged so as to be evenly distributed across the entire multiread sequence information (1-S) based on the method illustrated in the above-described FIG. 9.

As explained above, in this embodiment, in step S20 of FIG. 10, when the communication formats corresponding to a plurality of tag types are sequentially switched, they are switched in a switching order that corresponds to the actual number of times scanned of each tag type used in the past up to the present. As a result, during this switching, switching is performed in a switching order that matches the actual current usage situation, such that communication formats used frequently in the past (above-described class "A" etc.) appear often, or communication formats used infrequently in the past (above-described class "D" etc.) seldom appear. As a result, the expected value of the time until information scanning is executed after the operator holds up the RFID tag and places the RFID circuit element To within the communication range, for example, can be reduced compared to the case where the tag types are simply switched in the same proportion without differentiation between those used frequently and those used infrequently, or the case where a plurality of communication formats are sequentially switched according to a predetermined priority ranking. As a result, wireless communication can be performed quickly and efficiently.

Also, in this embodiment, in particular, multiread sequence information MD that corresponds to the actual number of times scanned is generated, and in step S20, switching is performed in a switching order that matches the actual current usage situation according to that multiread sequence information MD. Specifically, because tag types frequently used in the past are expected to be used with high probability in the future as well, the multiread sequence information MD is generated such that such tag types appear frequently. As a result, wireless communication can be performed efficiently, in a state that matches the actual current usage situation. In particular, by including each tag type at least once in one piece of multiread sequence information MD, the minimum required communication opportunities can be assured even for tag types that have never or almost never been used in the past.

Also, in this embodiment, in particular, each time communication with an RFID circuit element To is executed using any of a plurality of tag types provided in advance, that result is accumulated as the actual number of times scanned in the tag type table of the large-capacity storage apparatus 205, and in step S210 of FIG. 12, the actual number of times scanned J (1-TS) is acquired according to this accumulated result. Then, in step S215 through step S245, based on this actual number of times scanned J (1-TS), the number of times each tag type appears in one switching cycle can be calculated and set such that tag types frequently used in the past appear many times, and tag types infrequently used in the past appear few times.

Also, in this embodiment, in particular, by separately performing generation of multiread sequence information MD by the flow of FIG. 11 and switching of tag types (communication formats) by the flow of FIG. 10, the timing of generating multiread sequence information MD and the timing of actually performing communication by switching tag types in step S20 can be separated. That is, in the multiread sequence information update process, multiread sequence information MD is generated, with predetermined timing (or at predetermined fixed intervals), based on the latest actual number of times scanned (regardless of whether or not communication with an RFID tag circuit element To is performed). Then, in step S20, the tag types are switched and communication is performed based on the multiread sequence information MD generated at that point (regardless of the timing of generation by the multiread sequence information update process). As a result, when wireless communication is performed with an RFID circuit element To, tag types are switched in a switching order that corresponds to the latest actual number of times scanned at that point. As a result, wireless communication with RFID circuit elements To can be performed more efficiently.

Also, in this embodiment, in particular, by dividing the functionality between the operation terminal 200 and the apparatus 100, a general-purpose apparatus is sufficient as the apparatus 100, and the RFID tag communication system of this embodiment can be easily realized simply by installing applications that perform the control procedures and processes on the operation terminal 200 side, for example.

Note that the present disclosure is not limited to a configuration in which the operation terminal 200 and RFID tag communication apparatus 100 are configured separately and connected so as to be capable of transmitting and receiving information, as in the above-described embodiment. That is, the RFID tag communication apparatus can also have a configuration in which the CPU 203, memory 204, display part 201, operation part 202, large-capacity storage apparatus 205, radio frequency circuit 102 and communication antenna 101 are all integrated, as in a handheld reader (not shown in diagram), for example. In this case, the CPU 203 disposed in the RFID tag communication apparatus executes the multiread sequence information update process indicated in FIGS. 11-13 or the multiread process indicated in FIG. 10. In the case, the CPU 203 acquires the newest multiread sequence information acquired by the multiread sequence information update process in the step S5 of the FIG. 10, and the CPU 203 executes the above-described step S20 and step S25 as described above, on the basis of the newest multiread sequence information acquired.

As a result, when the plurality of tag types (communication formats) are sequentially switched in step S20, they are switched in a switching order that corresponds to the frequency of use results of each tag type used in the past up to the present. As a result, similar to the above-described embodiment, during this switching, switching can be performed in a switching order that matches the actual current usage situation. As a result, similar to the above, wireless communication with an RFID circuit element To can be performed quickly and efficiently without needless switching time.

Furthermore, in addition to the arrangement in which tag types are evenly distributed across the multiread sequence information MD as shown in the above-described FIG. 8 and FIG. 9, the multiread sequence information MD also can be arranged such that it is organized in order from the highest frequency class as shown in FIG. 14. In this case as well, by setting the number of communications according to the actual number of times scanned of each tag type, wireless communication corresponding to each tag type can be performed quickly with a suitable probabilistic expected value. In this case, the multiread sequence information MD can be quickly and easily generated because the process of even distribution of type of step S300 is unnecessary.

Note that the arrows shown in each figure above, such as FIG. 3, FIG. 4 and FIG. 5, denote an example of signal flow, but the signal flow direction is not limited thereto.

Also note that the present disclosure is not limited to the procedures illustrated in the flowcharts of FIG. 10, FIG. 11, FIG. 12, and FIG. 13, etc., and additions and deletions as well as sequence changes to the procedure may be made without departing from the spirit and scope of the disclosure.

Additionally, other than those previously described, methods according to the above-described embodiment and modification examples may be utilized in combination as appropriate.

What is claimed is:
1. An RFID tag communication system comprising:
a communication antenna that performs wireless communication using a plurality of communication formats with a plurality of types of RFID circuit elements, each of said RFID circuit elements having an IC circuit part configured to store information and a tag antenna configured to transmit and receive information, each type of said plurality of types of RFID circuit element having a different compatibility factor and lacking communication compatibility;
a results accumulation device that accumulates frequency of use results of each of said plurality of communication formats used in the past;
an assignment set portion that assign each communication formats a frequency class in order from the one with the highest frequency of use, in accordance with the results of accumulation by said results accumulation device;
a number of times calculation portion that calculates a number ratio of times each communication format is present in one switching cycle according to the frequency class that is assigned to each of said plurality of communication formats by said assignment set portion, the one switching cycle including at least one of each of said plurality of communication formats;
a format allocating portion that generates switching order information such that, among said plurality of communication formats, communication formats that are allocated higher frequency class appear with a higher frequency, by means of allocating each of said plurality of communication formats so as to be included by the number ratio of times calculated by said number of times calculation portion;
a format switching portion that sequentially switches said plurality of communication formats in accordance with said switching order information generated by said format allocating portion; and
an information acquisition portion that performs an acquisition process to acquire information by wireless communication from said RFID circuit elements using each of the communication formats that are sequentially switched by said format switching portion.

2. The RFID tag communication system according to claim 1, wherein:
said format allocating portion generates new said switching order information at predetermined fixed intervals; and
said format switching portion sequentially switches said plurality of communication formats using the new said switching order information generated by said format allocating portion.

3. The RFID tag communication system according to claim 1, further comprising:
an RFID tag communication apparatus having said communication antenna; and
an operation terminal capable of operating said RFID tag communication apparatus having at least said format switching portion, said information acquisition portion, said assignment set portion, a number of times calculation portion, a format allocating portion, and said results accumulation device.

4. The RFID tag communication system according to claim 1, wherein:
said communication formats include at least one communication compatibility factor among communication protocol, used command type, and communication parameters.

5. An RFID tag communication apparatus comprising:
a communication antenna that performs wireless communication using a plurality of communication formats with a plurality of types of RFID circuit elements, each of said RFID circuit elements having an IC circuit part configured to store information and a tag antenna configured to transmit and receive information, each type of said plurality of types of RFID circuit element having a different compatibility factor and lacking communication compatibility;
a results accumulation device that accumulates frequency of use results of each of said plurality of communication formats used in the past;
an assignment set portion that assign each communication formats a frequency class in order from the one with the highest frequency of use, in accordance with the results of accumulation by said results accumulation device;
a number of times calculation portion that calculates a number ratio of times each communication format is present in one switching cycle according to the frequency class that is assigned to each of said plurality of communication formats by said assignment set portion, the one switching cycle including at least one of each of said plurality of communication formats;
a format allocating portion that generates switching order information such that, among said plurality of communication formats, communication formats that are allocated higher frequency class appear with a higher frequency, by means of allocating each of said plurality of communication formats so as to be included by the number ratio of times calculated by said number of times calculation portion;
a format switching portion that sequentially switches said plurality of communication formats in accordance with said switching order information generated by said format allocating portion; and
an information acquisition portion that performs an acquisition process to acquire information by wireless communication from said RFID circuit elements using each of the communication formats that are sequentially switched by said format switching portion.

6. The RFID tag communication apparatus according to claim 5, wherein:
said format allocating portion generates new said switching order information at predetermined fixed intervals; and
said format switching portion sequentially switches said plurality of communication formats using the new said switching order information generated by said format allocating portion.

7. The RFID tag communication apparatus according to claim 5, wherein:
said communication formats include at least one communication compatibility factor among communication protocol, used command type, and communication parameters.

* * * * *